US005116015A

United States Patent [19]

Gassaway

[11] Patent Number: 5,116,015

[45] Date of Patent: May 26, 1992

[54] SECURITY MOUNTING

[76] Inventor: Mark M. Gassaway, 2201 Stern La., Oxnard, Calif. 93030

[21] Appl. No.: 175,598

[22] Filed: Mar. 25, 1988

Related U.S. Application Data

[63] Continuation of Ser. No. 799,798, Nov. 20, 1985, abandoned.

[51] Int. Cl.[5] .......... F16M 13/00

[52] U.S. Cl. .......... 248/553; 248/681; 248/205.1

[58] Field of Search .......... 248/553, 551, 222.4, 248/223.2, 205.1

[56] References Cited

U.S. PATENT DOCUMENTS

| | | | |
|---|---|---|---|
| 801,383 | 10/1905 | King | 248/222.4 |
| 836,986 | 11/1906 | McManmon | 403/408.1 |
| 4,022,036 | 5/1977 | Cebuhar | 248/553 |
| 4,065,083 | 12/1977 | Gassaway | 248/551 |
| 4,396,176 | 8/1983 | Hannula | 248/551 |
| 4,414,829 | 11/1983 | Nielsen | 70/DIG. 57 |
| 4,585,202 | 4/1986 | Parseleian | 248/553 |
| 4,613,109 | 9/1986 | Boscacci | 248/670 X |

FOREIGN PATENT DOCUMENTS

| | | | |
|---|---|---|---|
| 801031 | 12/1950 | Fed. Rep. of Germany | 403/408.1 |
| 6404996 | 11/1965 | Netherlands | 248/224.4 |

*Primary Examiner*—Alvin C. Chin-Shue
*Attorney, Agent, or Firm*—Donald D. Mon

[57] ABSTRACT

A security mounting in which two parallel plates are relatively slidable to trap headed clips which hold the plates together in the locked configuration. The plates are more ductile than a rigid surface to which one of them is adhesively joined so that prying forces bends the plates and they cannot then be separated by sliding movement. A skirted lock body frustrates prying forces.

2 Claims, 3 Drawing Sheets

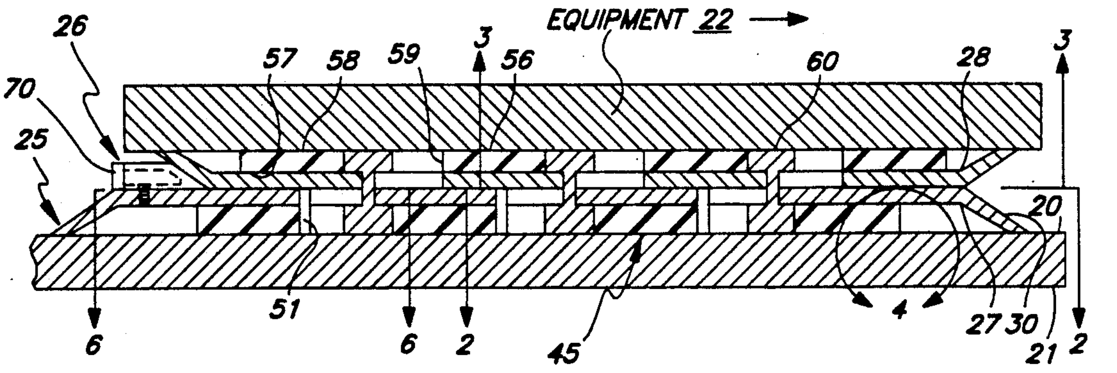
FIG. 1
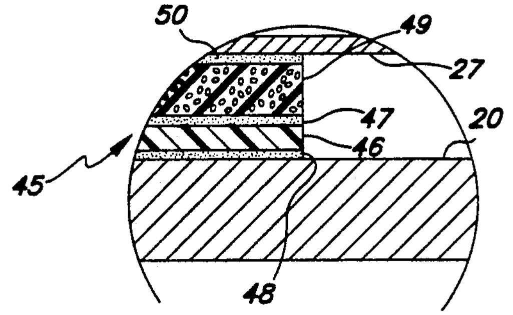
FIG. 4
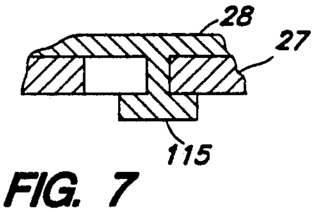
FIG. 7
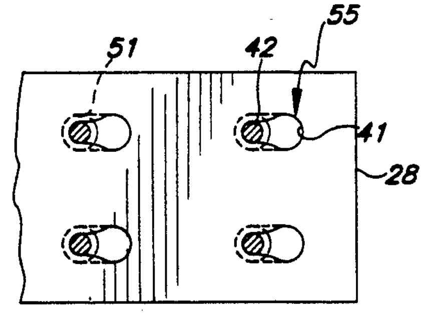
FIG. 3
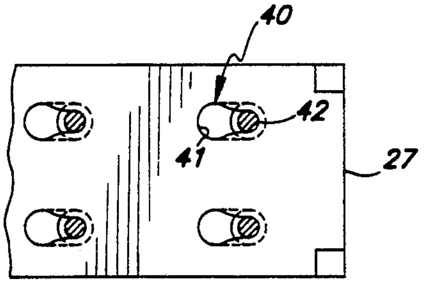
FIG. 2
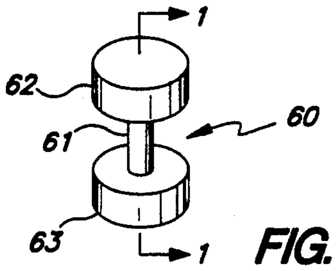
FIG. 5
FIG. 6
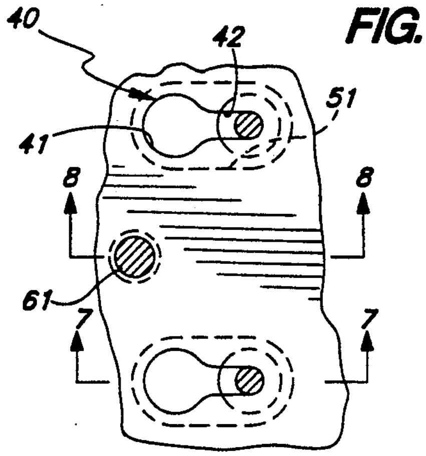

FIG. 8
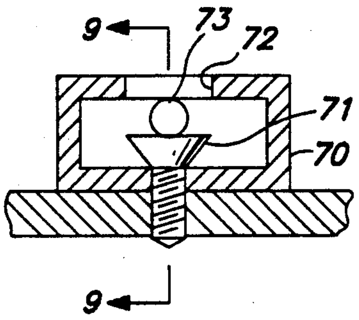
FIG. 9
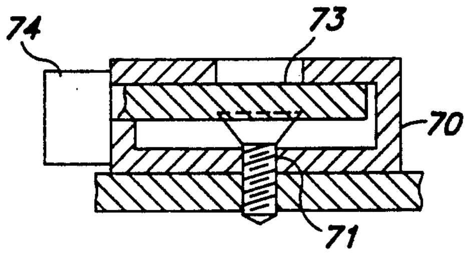
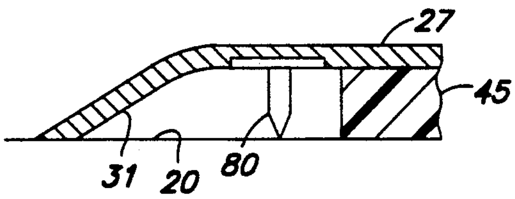
FIG. 10
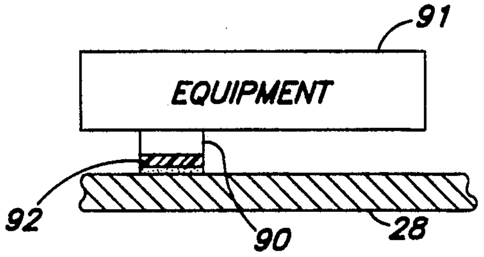
FIG. 11
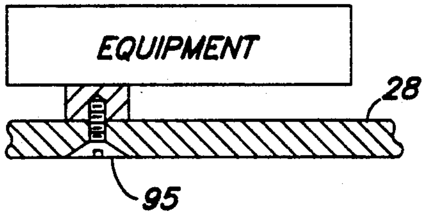
FIG. 12
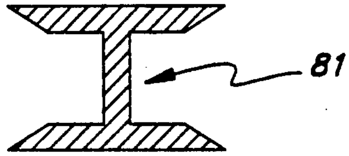
FIG. 13
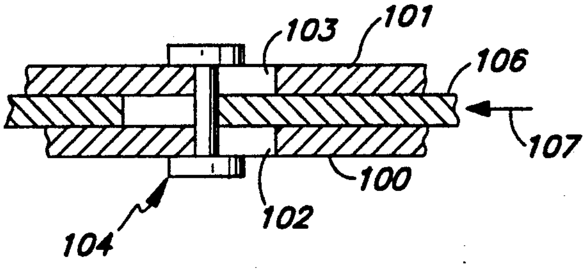
FIG. 14
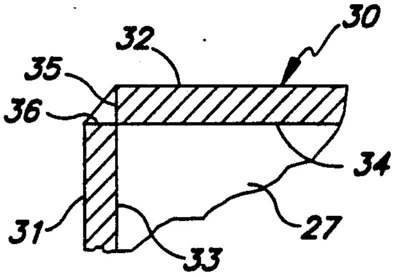
FIG. 15

FIG. 16
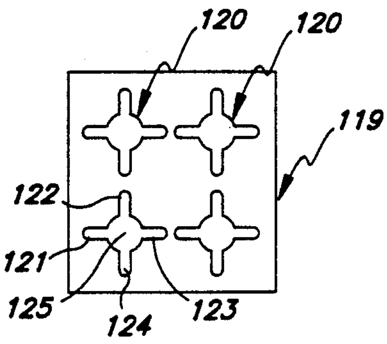
FIG. 17
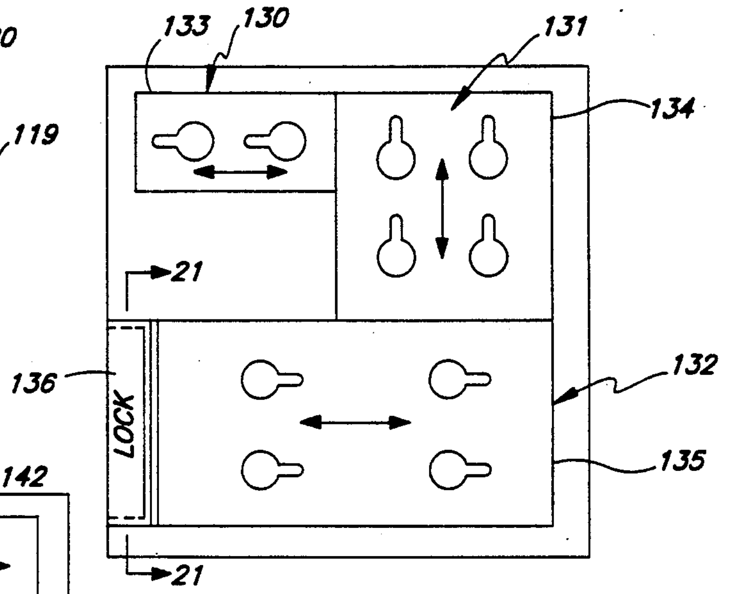
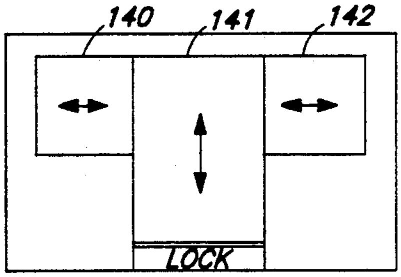
FIG. 18
FIG. 19
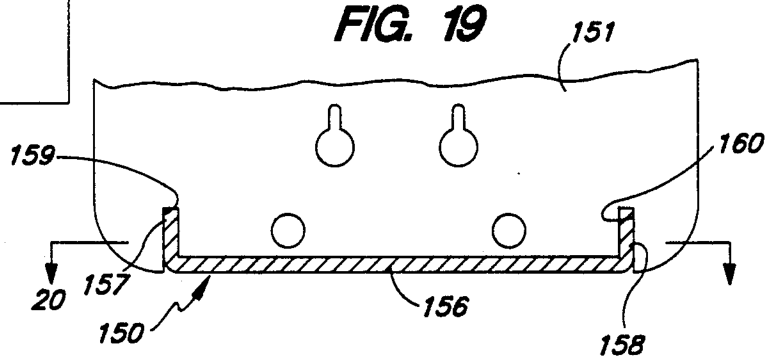
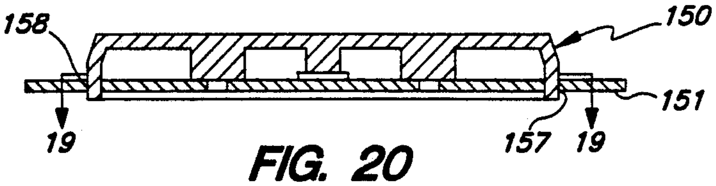
FIG. 20
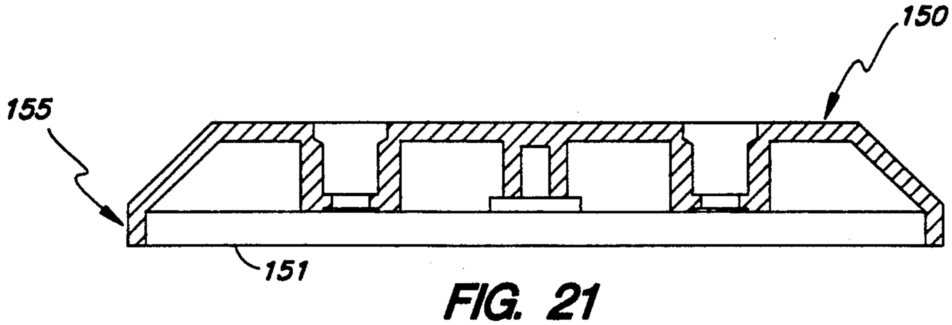
FIG. 21

SECURITY MOUNTING

This is a continuation of co-pending application Ser. No. 799,798 filed on Nov. 20, 1985, abandoned.

FIELD OF THE INVENTION

This invention relates to security mountings to hold an article securely to a surface, for example a computer or a business machine held to a desk or to a table top.

BACKGROUND OF THE INVENTION

The art of securing valuable devices such as computers or business machines to a surface such as the top of a desk or a table is a subject of extensive development. Generally it is recognized that no mounting can be completely secure. Almost any practical mounting can be overcome by brute strength or by the use of appropriate tools. Therefore, instead of attempting to provide an impregnable arrangement, the effort is or should be made to require such expenditure of time that the thief would run an unacceptable risk of capture to remove the article without damaging it, or of excessively damaging the article if he takes the article quickly enough.

Speaking generally, a five minute delay will discourage a thief, because this approaches the response time of police in many areas. Damaged goods cannot be fenced. So the theft becomes too risky or pointless if it takes too long or yields unsaleable goods. Therefore any device which can frustrate removal without damage for even a few minutes is advantageous, and may serve as well as a device which could absolutely hold the article. Such a "lesser" device can be made much less expensively.

Commercially successful devices have been made and sold in accordance with Gassaway U.S. Pat. Nos. 3,850,392 and 3,910,079. The scheme of these devices is to attach the equipment being secured to a rigid upper plate. A pad adhesively adheres to the surface, and a rigid lower plate or plates is or are secured to the pad. The upper and lower plates can releasably be locked together. The lower plate is often provided with a skirt which restricts access to the foam pad, and means is customarily provided to exclude a garrot wire from beneath the pad. For example, see Gassaway U.S. Pat. No. 4,065,083.

This construction provides an attractive alternative to systems which require drilling of holes in the furniture and using tie-down bolts or screws to hold the equipment to it. It offers the opportunity later to substitute the equipment and to change its location without leaving behind a structurally modified or defaced piece of furniture.

However successful the prior art devices have been they still require expensive parts which can be justified only for relatively expensive equipment. When the cost of equipment to be protected falls, as is the situation today with personal computers, a less expensive security device is needed because the cost of protecting an article ought not to approach the cost of the article itself. While seeking this objective, some of the shortcomings of the earlier devices can also usefully be addressed. This invention accomplishes all of these objectives.

One disadvantage of the earlier devices is that if the equipment is to be moved, the foam pad must be removed from the surface by the application of heat so it will come loose. This is a messy and time-consuming practice which often leaves a dirty surface behind. While messy, it still is an improvement over security mountings where the table or desk must be drilled or otherwise pierced.

Another surprising disadvantage of known mounting systems resides in their stiffness. One is inclined to assume that a very rigid device would be more difficult to remove from a surface, such as with the use of a pry bar, than a more flexible device. This is not rigorously true. Although it is tricky to accomplish, it is possible to "pop" a rigid system off of a surface by prying it up at its edge. Actually, and surprisingly, some flexibility is advantageous in the instant invention because, as will later be seen, if the edge is pried up, the plates are likely to be bent, and the protected article is likely to be destroyed before the mounting comes loose from the surface. Furthermore, even if not seriously damaged, the mounting is apt to remain attached to the equipment, because the mounting will be distorted in such a way as to prevent its removal. Because a thief has no reason to damage an article he wishes to steal, or to carry off the security mounting also, this feature alone contributes substantially to the security of the installation. If vandalism rather than theft were the object, a hammer would serve quite well for his purpose. But the thief's objective is to remove an undamaged and functional article, and this invention frustrates it. Interestingly enough this attractive feature is obtained with the use of less expensive, easier-produced parts.

Yet another disadvantage of many earlier devices is that the table or desk surface must be permanently dedicated to the equipment—even when the equipment is temporarily removed. This is because the lower plate includes projections that make it unsuitable for anything to be placed on it while the equipment is removed.

The device of this invention can readily be removed from the surface after its security feature is released, can be made much less expensively, is more flexible in certain parts in order to discourage attempts to pry it loose and causes an even stronger retention after an attempt has been made to bend it.

Yet another advantage of the invention is that it enables a plurality of devices to be secured with only one lock.

BRIEF DESCRIPTION OF THE INVENTION

A security mounting according to this invention utilizes an upper plate and a lower plate. The article being secured is attached to the upper plate, and the lower plate is fixed to the surface by an adhesive member. It will be recognized that the terms "upper" and "lower" are relative, to denote that they are not co-planer. A reversal of parts relative to the vertical is clearly within the scope of this invention.

The plates are parallel to one another, and are slotted to receive a plurality of clips. When the plates are suitably aligned relative to each other and the clips are properly positioned, the plates will be secure against out-of-plane separation from each other. The lock means prevents in-plane relative movement of the clips or of a plate to maintain this condition.

The clips are headed, and include a shank, and the slots are formed in a keyway shape having an entry port and a neck, such that the heads may pass through the entry port of the slot but are retained in the neck.

According to a preferred but optional feature of the invention, the plates are movable relative to one another in a shear fashion, and the slots being used are parallel but oppositely directed.

According to yet another feature of the invention, the lock means is skirted to prevent passage of a tool between the lock body and the plate to which it is attached.

According to yet another feature of this invention, the adhesive member holding the lower plate to the surface is adapted readily to be parted cleanly from the surface without requiring application of heat.

According to yet another preferred but optional feature of the invention, a single lower plate may underlay a plurality of upper plates, and the slots of each upper plate may be related to slots in the lower plate in such a way that a sequence of articles may be secured to a single lower plate, all but one upper plate being restrained against shear movement by a neighbor plate or article, and that one upper plate is secured by lock means.

BRIEF DESCRIPTION OF THE INVENTION

The above and other features of this invention will be fully understood from the following detailed description and the accompanying drawings, in which:

BRIEF DESCRIPTION OF THE DRAWINGS

FIG. 1 is a vertical cross-section, partly in schematic notation, showing the presently preferred embodiment of the invention;

FIGS. 2 and 3 are fragmentary cross-sections taken at lines 2—2 and 3—3, respectively, in FIG. 1;

FIG. 4 is an enlarged detail of region 4 in FIG. 1;

FIG. 5 is a perspective view of a clip in FIG. 1;

FIG. 6 is a fragmentary cross-section taken at line 6—6 in FIG. 1.

FIG. 7 is a schematic showing of an alternate clip to join the plates;

FIG. 8 is a fragmentary cross-section of a lock shown in FIG. 1;

FIG. 9 is a cross-section taken at line 9—9 in FIG. 8;

FIG. 10 is a fragmentary showing of an additional means to resist garrot wires;

FIGS. 11 and 12 are schematic showings of other means to attach equipment to a plate;

FIG. 13 shows another anti-garrot device;

FIG. 14 is a fragmentary showing of another means to lock plates together;

FIG. 15 shows a useful edge and corner treatment for the plates;

FIG. 16 shows a slot scheme which enables the plates to be joined by shear movement in four different directions.

FIG. 17 shows a slot scheme which enables a plurality of articles to be secured with a single lock, all but one of the articles being secured in its place by its neighbor;

FIG. 18 schematically illustrates yet another slot and joinder scheme;

FIG. 19 is a fragmentary cross-section taken at line 19—19 in FIG. 20;

FIG. 20 is a fragmentary cross-section taken at line 20—20 in FIG. 19; and

FIG. 21 is a fragmentary cross-section taken at line 21—21 in FIG. 17.

DETAILED DESCRIPTION OF THE INVENTION

FIG. 1 shows an upper surface 20 of an article of furniture 21 such as a table or desk. The objective of the invention is releasably to secure equipment 22 such as a computer or a printer to surface 20. The ultimate security element, by which security mounting 25 holds the equipment, is a lock 26 can be released by a key or a combination, or by any other desired means.

At the heart of the mounting are a lower plate 27 and an upper plate 28. The lower plate is secured to the surface, and the equipment is secured to the upper plate. When the lower plate is secured to the surface, and the plates are held together and the lock is fastened, the mounting prevents (or at least greatly impedes) removal of the equipment from the surface. When the lock is unfastened, the plates can be separated and the equipment can be removed. The details of this construction will now be described.

Lower plate 27 has an extended surface underlaying the equipment, and extends in all directions beyond the edges of the equipment. It has a skirt 30 which depends downwardly to the surface, or to a short distance above it. Because the plates can and should be made of inexpensive metal, they can readily be stamped, bent and punched. In fact, for this invention, a low carbon steel, perhaps 1040, is desirable because of its flexibility and ductility. It ordinarily should not be thicker than about 12 gauge.

The skirt, as best shown in FIG. 15, can be formed in segments 31, 32 so that bends 33, 34 can conveniently be formed along the edges. A cut-out notch 35 at each corner enables this to be accomplished with simple tooling and without plate distortion. Then a plastic corner-filler 36 can be snapped in for good appearance.

A plurality of keyhole slots 40, all alike and aligned, are formed through the plates. Each slot has an entry port 41 and a narrow neck 42. Beneath and adhered to the lower plate is an attachment means 45 (sometimes called a "pad" or an "adhesive pad"). In this example, an adhesive member secures the plate to the surface. It is best shown in FIG. 4.

Because it is desirable to be able to remove the pad from the surface without application of heat, its adhesive means is a double faced tape 46 having contact adhesive 47, 48 on both sides. It is a "peelable" tape. This could, if desired, be attached directly to the lower plate. However, in order to have some ability to comform to an irregular surface, a foam layer 49 with an adhesive facing 50 can be mounted to layer 47, and the pad will be fixed to the lower plate. Now the lower plate can be pressed toward the surface, and the pad will bear against and adhere to the surface. It will thereby hold the lower plate corner fillers and plate edges so they closely approach the surface. There usually be a minor spacing between the lower edges and the surface. The pad covers a substantial part of the under surface of the lower plate.

Pad 45 is ported by a port 51 at each keyhole slot, as best shown in FIG. 6. The width of ports 51 is at least as wide as the entry ports of the keyhole slots, and ports 51 extend for the full length thereof, for a reason which will be described.

Upper plate 28 also has a plurality of keyhole slots 55, all alike and aligned. When the two plates are placed parallel to one another, the slots at least partially overlay one another, but are oppositely directed. Their necks are parallel and disposed so as to overlay one another in some plate positions. An attachment pad 56, having adhesive on both faces 57, 58 is adhered to the equipment's lower surface, and to the upper plate. This pad is also ported at ports 59, which have identical dimensions to those in the lower pad, and for the same purpose. This pad covers a substantial area and mounts the equipment to the security mounting.

In order to hold the plates to one another, a plurality of clips are provided. All of them are identical. Exemplary clip 60 is shown in FIG. 5. It has a central shank 61 whose diameter is a bit smaller than the width of the necks of the keyhole slots slot. The axial length of the shank is substantially equal to the combined thickness of the two plates. At each end there is a circular flange 62, 63, whose diameter is somewhat smaller than that of the entry port of the slot, and somewhat larger than the width of the neck part. The ports through the pads clear the edges of the flanges in all positions which the flanges will assume.

To join the plates after the lower plate has been fixed to the surface, clips are placed in all or in a selected number of its keyhole slots. They are then pushed into the neck of the slots respective. Then the upper plate is placed over the clips, the flanges entering the entry ports of the slots. Then the upper plate is slid in a shear movement along the lower plate until all of the shafts are in the necks of the slots and bear against their ends. Notice that the slots of the two plates are oppositely directed so that shear-like movement of the top plate relative to the bottom plate causes the clips to be pushed by one plate or the other unitl they are trapped at the ends of the necks. Now the flanges lock the plates together at their extreme limit of movement in this direction. If the plates are relatively locked in this position, then the plates cannot be separated until the upper plate is released so it can be moved so that the entry port of every slot overhangs every flange.

Notice that the clips are not bonded to anything. They are freely slidable in the slots. The pads clear the flanges. The clips can readily be removed when the plates are separated. When they are removed, the lower plate provides a smooth surface on which articles can be placed. This is a substantial advantage over devices where loops and the like project above the bottom plate and prevent the use of the area as a support.

The details of the lock are best shown in FIGS. 6, 8, and 9. A lock case 70 is screwed to the lower plate by screw 71. In this position, it abuts the article being protected, or the upper plate, or something integral with the upper plate. To slide the upper plate in the releasing direction, this case must be removed, or the screw must be sheared off. The case has an upper hole 72 giving access to the head of the screw so it can be threaded in or out. Access to the screw is prevented by a cross-rod 73 which overlays it. In turn, the cross-rod is protected from removal by the lock 74. To separate the plates, the lock must be unfastened, rod 73 removed, and the screw taken out. Then the case can be taken off and the upper plate can slide relative to the lower plate to where the clips will be released. The plates can then be separated and the equipment removed with the upper plate. This is a very substantial protection, and more than one screw can be provided to attach the lock if desired.

Pad attachments are sensitive to garrot wires because the wires can cut through them, or can cut beneath them. If desired, anti-garrot means such as a point 80 (FIG. 10) or a double headed tapered round shank member 81 (FIG. 13) may be placed between the upper plate and the surface outside of the pad. However, the clips of this device function very effectively an anti-garrot means, and additional such means are not necessary. Notice that the flanges of each clip bear against a respective surface so as to prevent the passage of a wire between them. Generally there will be many of these clips, and as an anti-garrot means they are quite effective. If desired, the flanges of the clips can be tapered as shown in FIG. 13 to deflect a wire inwardly toward the shank, even more effectively to resist passage of the wire.

FIG. 11 shows that a foot 90 on equipment 91 can be adhesively secured to the upper plate by an adhesive pad 92 instead of requiring a full surface contact with the bottom of the equipment.

FIG. 12 shows that the attachment of the equipment to the upper plate can be structural, such as by a screw 95, rather than adhesive, all with the same advantage.

FIG. 14 shows a modification of lower plate 100, and upper plate 101. They are provided with keyhole slots 102, 103, respectively, of the same size and shape as in FIG. 1. A clip 104, identical to clip of FIG. 5 except with a longer shank, is used. However, in this embodiment, the necks of the slots are identically directed, instead of oppositely directed. This is a somewhat more complicated construction, but is very effective.

In this embodiment a lock plate 106 is interposed between the upper and lower plates. When it is shoved in the direction shown by arrow 107, it moves all of the clips into the necks of the slots, and when it is locked in place, it holds them there. A lock is provided for that purpose such as the lock of FIG. 8. In this embodiment, security depends on the holding of the lock plate relative to the upper and lower plates rather than on preventing sliding of the upper or the lower plate. In some installations, this will be a convenience. To unlock the device, the lock plate is moved in the other direction until the clips are aligned with the entry ports.

FIG. 7 shows that a clip 115 can be formed as part of the upper plate, rather than as a separate piece. The function is similar, except that the clips are not separate bodies.

FIGS. 16–18 show various means to enlarge the capacity and convenience of use of this invention. In FIG. 16, a plate 119 (which can be used for either or both of the upper and lower plates), is provided with slots 120, each of which has a plurality of necks 121, 122, 123 and 124. These all branch from a single central entry port 125. The flanges of clips (not shown) can be inserted into the entry ports, and then the plates can be moved in any of four directions. A lock (not shown) can hold the plates at the extreme in any of these directions. Thus, the mounting means is adaptable to be used by movement of one plate relative to the other in any of four direction.

FIG. 17 shows how the invention can securely mount a plurality of articles, using a plurality of upper plates, and a plurality of sets of differently aligned slots. These are plates 130, 131 and 132. The patterns 133, 134 and 135 indicate the relative positions of the overlaying upper plates when in their locked position. Alternatively, these patterns could instead represent neighboring articles mounted to upper plates. In any event, the upper plates would be slotted as in FIG. 1. Then plate 130 would be positioned as shown, and be blocked by 131, which would be blocked by plate 132. Then only plate 132 need be secured, and it is, by a lock 136. The lock may be the lock of FIG. 1. or of FIGS. 19–21, as preferred.

FIG. 18 shows three articles or plates 140, 141, 142. Lock 143 prevents removal of plate 141. The articles are mounted to these upper plates. The upper plates are joined to the lower plate as in FIG. 1. The orientation of the slots is shown by the arrows.

Instead of plates abutting one another, articles mounted to the plates may abut, thereby to perform the same blocking function.

The lock shown in FIG. 6 is excellent for its purposes. However, sometimes it is possible to get a screwdriver or pry bar between the lock and the lower plate, and this may enable the lock to be pulled off. This problem is solved by lock case 150 in FIGS. 19–21, which can be used instead of the case in FIG. 1, if preferred. The lock case can be attached to the lower plate 151 is any desired way. One useful way is by screws held to rotatable locks in lock ports 152 and 153, which thread into thread-tapped holes 154 in the lower plate, and which cannot be unthreaded without a key.

To protect the case, a skirt 155 extends to below the lower plate. It extends around outer edge 156, and side edges 157 and 158. The back edge is protected by the upper plate or by the article itself. Channels 159, 160 receive the side edges to enable them to extend beneath the lower plate. Now a screwdriver has no access between the lock case and the lower plate.

This device offers many advantages over its predecessors. Perhaps the most surprising is the fact that, by making the plates from relatively ductile steel they are likely to bend and destroy the protected article before the pad releases from the surface. Also, it frustrates efforts to pop the mounting off of the surface. It will bend first.

Also, when it does bend, then the thief has still another problem. Almost any substantial deformation of the plates will most likely cant one slot relative to the other so that the shank of at least one clip will be locked in place. Then the plates cannot be separated by relative sliding of the plates.

Especially when the pad shown in FIG. 4 is used, the adhesive pad can cleanly be removed by peeling, or with a garrot wire, the latter after the clips are removed. It is an advantage of this invention that the clips function both as joinders for the plates, and as anti-garrot means. When they are removed, a clean removeal of the pad is possible, without needing heat for the purpose.

It is interesting to observe that the clips, when used double-headed, can protect both the article against separation from the upper adhesive member, and the lower pad from separation from the surface. The protection at the edge of the plates is of significantly less importance.

This mounting can readily be made by inexpensive processes, using simple parts. Although less expensive, and seemingly less sophisticated, it has suprising advantages to the extent one would not ordinarily predict for a simple construction.

This invention is not to be limited by the embodiments shown in the drawings and described in the description, but only in accordance with the scope of the appended claims.

I claim:

1. A security mounting to hold a protected article which is to be retained to a rigid substrate body from which substrate body the article can be legitimately be removed only by conforming to unlocking requirements of the mounting, said mounting comprising:

a first and a second plate; each plate having a substantial planar area adapted to lie in parallel relationship to one another; and to be held together in such a way that unless the mounting is locked one plate can move relative to the other in an in-plane sliding relationship, at least one of said plates having a plurality of spaced-apart aligned slots, each slot having an enlarged entry port, and a narrower neck extending from said entry port:

means for attaching one of said plates to said substrate body;

a plurality of clips each clip having a shank dimensioned to fit in a respective said neck, and at least one flange dimensioned to pass through a respective said entry port when the shank is centered in said entry port, but to overhang the edges of said neck to frustrate out-of-plane separation of said plates when plates are shifted so that the shank is in said neck, permitted separation being only as the consequence of inplane relative movement of said plates;

lock means attachable to one of said plates to prevent in-plane sliding movement in the direction of alignment of said slots when said flanges are aligned with respective said necks, said lock means in attached, and to permit relative sliding movement to enable separation of the plates when removed;

both of said plates being made of metal of such ductility and thickness that a sufficient out-of-plane force on at least one of said plates when coupled by said clips is likely to bend at least one of said plates; said consequent bending of either or both of said plates causing at least one assembly of slot and clip to hold said plates against in-plane separtion from one another; said protected article being thereby retained to each other as the consequence of said deformation;

said means for attaching comprising and adhesive pad which has a substantial thickness, in which said pad is ported to accommodate said flanges of said clips for unimpeded movement therein through the full range of movement of the clips in the slot while said clips move in said slots.

2. A security mounting to hold a protected article which is to be retained to a rigid substrate body from which substrate body the article can be legitimately be removed only by conforming to unlocking requirements of the mounting, said mounting comprising:

a first and a second plate; each plate having a substantial planar area adapted to lie in parallel relationship to one another; and to be held together in such a way that unless the mounting is locked one plate can move relative to the other in an in-plane sliding relationship, at least one of said plates having a plurality of spaced-apart aligned slots, each slot having an enlarged entry port, and a narrower neck extending from said entry port:

means for attaching one of said plates to said substrate body;

a plurality of clips each clip having a shank dimensioned to fit in a respective said neck, and at least one flange dimensioned to pass through a respective said entry port when the shank is centered in said entry port, but to overhang the edges of said neck to frustrate out-of-plane separation of said plates when plates are shifted so that the shank is in said neck, permitted separation being only as the consequence of inplane relative movement of said plates;

lock means attachable to one of said plates to prevent in-plane sliding movement in the direction of alignment of said slots when said flanges are aligned with respective said necks, said lock means is attached, and to permit relative sliding movement to enable separation of the plates when removed;

both of said plates being made of metal of such ductility and thickness that a sufficient out-of-plane force on at least one of said plates when coupled by said clips is likely to bend at least one of said plates; said consequent bending of either or both of said plates causing at least one assembly of slot and clip to hold said plates against in-plane separation from one another; said protected article being thereby retained to each other as the consequence of said deformation;

the flanges beneath said one of said plates being of such thickness as to approach the surface closely, whereby to frustrate the passage of a garrot wire.

* * * * *